J. RADER.
Corn Planter.
No. 92,882. Patented July 20, 1869.
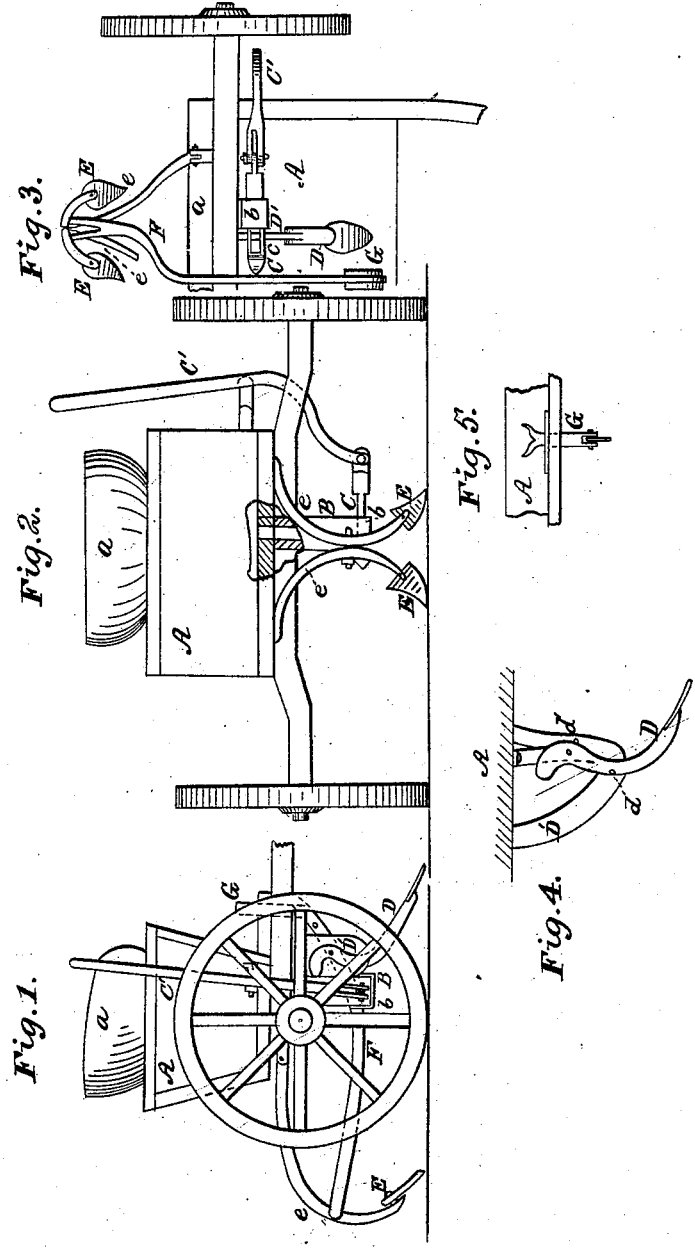
Witnesses:
Inventor:
J. Rader

United States Patent Office.

JONATHAN RADER, OF DALEVILLE, INDIANA.

Letters Patent No. 92,882, dated July 20, 1869.

IMPROVEMENT IN CORN-PLANTER.

The Schedule referred to in these Letters Patent and making part of the same.

*To all whom it may concern:*

Be it known that I, JONATHAN RADER, of Daleville, Delaware county, in the State of Indiana, have invented a new and useful Improved Corn-Planter; and I do hereby declare that the following is a full, clear, and exact description of the same, reference being had to the annexed drawings, making part of this specification, in which—

Figure 1 represents a side elevation of my corn-planter;

Figure 2, a rear elevation of the same, with portion of the seed-box and spout shown in section;

Figure 3, a bottom view of a portion of the same;

Figure 4, a side elevation of the front shovel or drill, and its attachment; and Figure 5, a front view of the foot-lever, by means of which the rear shovels or scrapers may be raised.

Corresponding letters refer to corresponding parts in the several figures.

My invention relates to that class of agricultural implements called corn-planters; and It consists in the combination and arrangement of its parts as hereinafter more fully explained.

The following description will enable those skilled in the art to make and use my improved device.

The planter is mounted upon two wheels; and

In the drawings—

A represents the seed-box, which is placed upon the axle and thills of the shaft, between the wheels. Its lid is provided with a seat, upon which the driver sits when operating the machine.

B represents the spout, into which the corn drops, through an aperture in the bottom of the seed-box. It is firmly secured to the seed-box, a little to one side, and may be made of wood or sheet-metal. Its lower end is embraced by a strap, b, of metal, in such a manner that there is enough space between it and the strap to allow the insertion of the seed-slide.

C represents the seed-slide, which is placed, and fits nicely between the lower end of the spout and the strap, and is made to slide laterally back and forth by means of a hand-lever, C', which is attached to one end of the slide, and extends upwards far enough to be within easy reach of the operator; said lever having its fulcrum in a bolt, which attaches it to a forked eye-bolt, secured to one side of the said box. The slide is provided with a slot, c, which is filled with corn as it is brought under the spout, and drops the seed, as the slide is pushed out, into the furrow made by the drill. That portion of the slide which has the slot, has a boss upon its end, to prevent its being drawn from under the spout.

D represents the front shovel or drill, the handle of which is forked, and is attached, midway between the wheels, to the standard D', which is firmly secured to the bottom of the seed-box, and in front of the spout. The jaws, at the handle of the drill, are hinged to the standard at d, and extend, then, some distance upwards, when they are again secured to the standard, by means of a bolt; said standard being here provided with two or more eyes, d', by which means, and the peculiar curved construction of the handle, the drill may be set to make a deeper or shallower furrow.

E E represent the scrapers, which are attached to the axle, and in rear of the spout, by means of the curved bars e e, to the ends of which they are secured. The other ends of these bars are hinged to forked eye-bolts, secured to the axle. By reference to fig. 2, it will be seen that at a certain point, about midway between the ground and the axle, the bars are brought together—and they may be wedged together here—after which, they again recede from each other, so that the scrapers may be at the proper distance apart. Where the bars meet, they are attached, by means of a bolt, to connecting-rod F.

F represents the connecting-rod, connecting the bars of the scrapers to the foot-lever.

G represents the foot-lever, which is pivoted in a cross-beam, placed across the shaft, and in front of the seat. It is a straight lever, one arm of which extends downwards, and is attached to the connecting-rod F, its other arm, of about the same length, extending upwards, and having its end forked, or formed so that the foot of the operator may rest on it.

The operation is as follows:

The operator sits on the seat, and guides the horse with the left hand, while his right hand takes hold of the lever C', and one of his feet may rest on the foot-lever.

As the machine is drawn forward, a furrow is made by the drill.

The operator alternately fills the seed-slide, and drops the corn by operating the hand-lever, and the seed are covered by the scrapers.

By pushing the foot-lever from him by his foot, he may raise the scrapers from the ground, and high enough to overcome any obstruction which is met with.

Having thus described my invention,

What I claim, and desire to secure by Letters Patent, is—

1. The combination of the drill D with standard D', substantially as shown and described.

2. The combination of the scrapers E, bars e, with connecting-rod F and lever G, arranged to operate substantially as set forth.

In testimony whereof, I have signed my name to this specification, in the presence of two subscribing witnesses.

JONATHAN RADER.

Witnesses:
WM. A. SHOEMAKER,
JAMES STEWART.